United States Patent Office 3,449,293
Patented June 10, 1969

3,449,293
ORGANOSILANE POLYMERS AND METHODS OF PREPARATION THEREOF
Alfred J. Burzynski and Robert E. Martin, Toledo, Ohio, assignors to Owens-Illinois, Inc., Toledo, Ohio, a corporation of Ohio
No Drawing. Original application Sept. 5, 1963, Ser. No. 306,711. Divided and this application Oct. 28, 1966, Ser. No. 604,498
Int. Cl. C08g 31/09, 31/34
U.S. Cl. 260—46.5                                   11 Claims

ABSTRACT OF THE DISCLOSURE

Method for making solid polymeric products by polymerizing an alkoxysilane with ethyl or methyl acrylates or methacrylates in an aqueous emulsion-redox system containing a water soluble peroxide initiator.

---

The present application is a division of application Ser. No. 306,711 filed Sept. 5, 1963, now abandoned.

The present invention relates to a novel method for polymerizing certain organosilanes and unsaturated monomers, and more particularly to a novel method for polymerizing alkoxysilanes and acrylic esters and solid polymers produced thereby.

Silicon-containing polymers have become important as industrial materials, particularly, where high temperature strength and stability are required. Many different types of polymeric products containing silicon have been produced in the past. However, previous attempts to obtain polymers of organosilanes and certain unsaturated compounds have employed polymerization systems which have produced polymeric products with a limited applicability. The polymerization products obtained heretofore have been viscous liquids or gelatinous masses or products highly soluble in most solvents, and as a result have not been suitable for use where chemical and thermal stability are required.

Accordingly, it is an object of this invention to provide a method for polymerizing certain organosilanes with acrylic esters which avoid the disadvantages inherent in the known methods and compositions.

It is a further object of the present invention to provide novel polymers of certain alkoxy silanes and acrylic esters which are characterized by improved properties.

It is a further object of the present invention to provide a method for the polymerization of certain organosilanes with acrylic esters to produce novel solid polymeric products.

Still another object of the present invention is to produce novel and useful solid, essentially insoluble polymers of particular silanes and acrylic esters.

In attaining the above objects, one feature of the present invention resides in a simultaneous addition and condensation polymerization reaction to obtain the desired polymeric product of the organosilane and unsaturated compounds.

Another feature of the present invention resides in the co-condensation polymerization of certain organosilanes with acrylic esters to produce elastomeric products.

Other objects and features will become apparent from the following detailed description of the present invention.

It has now been discovered that certain alkoxysilanes, as will be described hereinafter in greater detail, can be polymerized with acrylic esters, in an aqueous emulsion to produce new polymeric products which have improved chemical and thermal resistance and stability. It has further been discovered that a novel group of insoluble polymers can be prepared according to the present invention.

The novel polymeric products of the present invention are superior in several significant properties as compared with the conventional polymers of acrylic esters, and are characterized by exhibiting relatively low deformation when subjected to heat, good grease and oil resistance, chemical resistance and elasticity. The novel polymeric products of the present invention are applicable for many and diverse purposes. They can be employed as gasket and packing materials, engine mounts, fibers and as adhesives. Moreover, because the present polymeric materials are normally white or translucent their general usefulness is even further extended. A further important property of the polymeric materials is their ability to harden upon heating thereby producing a hardened rubber without necessitating the use of a vulcanizing agent. In addition, the novel insoluble polymers of the present invention are particularly valuable wherever resistance to solvents is essential.

In carrying out the present invention the alkoxysilane and the acrylic ester are mixed together and the reaction takes place in an emulsion-redox system using water soluble peroxide initiators. The mechanism by which this reaction takes place has not been definitely established, and although applicants do not wish to be bound by any particular theory, it is believed that the silane and the acrylic ester are hydrolyzed and the copolymerization reaction is a simultaneous addition-condensation reaction.

The emulsion-redox system employed for the present invention contains water, the monomers, an emulsifying agent such as the sodium salt of alkylaryl polyether sulfonate (sold under the trademark Triton X–200) or nonylphenyl polyethylene glycolether (sold under the trademark Tergitol NPK), and the like and a peroxide initiator such as t-butyl hydroperoxide. In addition, the reaction medium contains the usual components as for example, sodium bisulfite, ammonium persulfate and ferrous sulfate heptahydrate. Other emulsifiers and peroxide initiators can also be employed for purposes of the present invention:

Included among the alkoxysilanes that can be employed for purposes of this invention are those represented by the structural formula:

I. 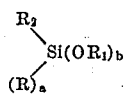

wherein R is a member selected from the group consisting of monovalent saturated aliphatic hydrocarbon radicals and monovalent aromatic hydrocarbon radicals, $R_1$ is an alkyl radical, $R_2$ is a member selected from the group consisting of monovalent saturated aliphatic hydrocarbon radicals, monovalent aromatic hydrocarbon radicals and $R_1O—$, $a$ is an integer from 0 to 2, $b$ is an integer from 1 to 3, and the sum of $a$ and $b$ is always 3. Included within the scope of Formula I are compounds wherein R is an alykl radical of from 1 to 6 carbon atoms, and a hydrocarbon aryl radical of from 1 to 9 carbon atoms, $R_1$ is an alkyl group of from 1 to 6 carbon atoms, and $R_2$ is a member selected from the group consisting of alkyl radicals of from 1 to 6 carbon atoms, hydrocarbon aryl radicals of from 1 to 9 carbon atoms, and $R_1O—$.

Further examples of alkoxysilanes that can be employed according to the present invention are those containing olefinic unsaturation represented by the structural formula II.   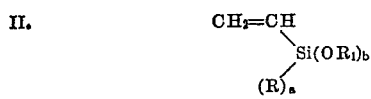

wherein $R_1$ and R, a and b have the same meaning as given above.

Representative but non-limiting examples of compounds included by structural Formulae I and II are: methyltrimethoxysilane, ethyltriethoxysilane, amyltriethoxysilane, diphenylidiethoxysilane, phenyltriethoxysilane, methyltriethoxysilane, vinyltriethoxysilane, vinyltrimethoxysilane, methyltri(1 - propoxy)silane, methyltri(2 - propoxy)silane, methyltri(2 - methyl - 2 - propoxy)silane, methyltri(1 - butoxy)silane, phenyltrimethoxysilane, phenyltri(1-propoxy)silane, vinylphenyldimethoxysilane, (1-methylethyl)trimethoxysilane, di(1-methylpropyl)diethoxysilane, methylorthosilicate, ethylorthosilicate, vinyltributoxysilane.

Further silanes that may be employed for the purposes of the present invention are alkylpolysilicates; e.g., ethylpolysilicate ranging from dimers to polymers of about 20 recurring monomer units.

Still further examples of silanes which are included for the purposes of the present invention are polymers of silanes represented by structural Formula II:

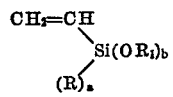

and mixtures thereof, wherein R, $R_1$, *a* and *b* have the same meaning ascribed to them above.

Included and representative of this group of silanes is polyvinyltriethoxysilane.

The acrylic esters which are polymerized with the alkoxysilane materials defined supra, are alkyl esters of acrylic acids of the formula selected from the group consisting of

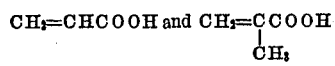

Specific examples of alkyl esters of acrylic acids include: ethyl acrylate, methyl acrylate, methyl methacrylate, ethyl methacrylate.

In carrying out the polymerization reaction the monomers are mixed together in water containing the emulsifying agent in sufficient amount to form the desired emulsion. After all of the other ingredients are added the polymerization initiator is added. Depending on the extract ingredients which are employed, it may be necessary to heat the reaction system. The proportion of the silane can be considerably varied and it has been found that the silane can be present in the amount of from about 5% to 300% by volume of the acrylic ester.

The following examples illustrate the present invention but are not considered as limiting the invention in any way.

EXAMPLE I

The following standard emulsion polymerization recipe was used in polymerizing ethyl acrylate with various amounts of vinyltriethoxysilane.

43 ml. low inhibitor ethyl acrylate (0.02% MEHQ)
0.2 g. ammonium persulfate
0.8 ml. ferrous sulfate solution (0.3 g. in 200 ml. distilled water)
75 ml. distilled water
4.8 g. nonylphenyl polyethyleneglycol ether (Tergitol NBX) non-ionic emulsifier
0.28 sodium metabisulfite
2 drops t-butyl hydroperoxide The amount of vinyltriethoxysilane used was 50% of the ethyl acrylate (by volume). The indicated amounts of the reactants shown in the above recipe were mixed in a 250 ml. beaker on a Stir-Plate whereupon a milky emulsion was formed. No heat was applied during the mixing. Within a few minutes after the sodium metabisulfite and t-butyl hydroperoxide were added a rapid exothermic reaction took place and the temperature rose to about 70° C. The mixture became very viscous and when cool, sodium sulfate was added to break the emulsion, the particles of the product coalesced into a white rubbery mass which was washed free of salt and excess reagents by kneading in water.

The above procedure was repeated employing the identical formulation with the exception that the amounts of vinyltriethoxysilane used were 1, 10, 15, 25 and 75% of the ethyl acrylate by volume. The products formed were generally satisfactory in that they were solid materials possessing improved thermal and chemical stability. In addition, the products produced from the unsaturated alkoxysilanes were insoluble in common organic solvents as shown in Table II, infra.

EXAMPLE II

A copolymer of ethyl acrylate and vinyltriethoxysilane was prepared employing the following redox-emulsion system recipe:

75 ml. distilled water
4.8 g. sodium salt of alkyl aryl polyether sulfonate (Triton X-200) emulsifier
43 ml. ethyl acrylate
21.5 ml. vinyltriethoxysilane
0.9 ml. ferrous sulfate heptahydrate
0.2 g. ammonium persulate
0.2 g. sodium metabisulfite
12 drops t-butyl hydroperoxide The emulsifier was weighed into a beaker, water added and stirred until the emulsifier dissolved. The ethyl acrylate was then added followed by the addition of vinyltriethoxysilane, ferrous sulfate heptahydrate, ammonium persulfate and sodium metabisulfite. Next the peroxide initiator was added dropwise. The reaction began immediately and no heating was necessary since the reaction was strongly exothermic. Within approximately fifteen minutes the reaction had stopped and the product which was white and rubbery was recovered after washing with water. The resulting product had a considerably greater heat resistance than the polyacrylates, per se and was insoluble in organic solvents as shown in Table II, infra.

EXAMPLE III

A copolymer of ethyl methacrylate and vinyltriethoxysilane was prepared by using the following emulsion system.

75 ml. distilled water
4.8 g. sodium salt of alkyl aryl polyether sulfonate emulsifier
43 ml. ethyl methacrylate
21.5 ml. vinyltriethoxysilane
0.8 ml. ferrous sulfate heptahydrate
0.2 g. ammonium persulfate
0.2 g. sodium metabisulfite
15 drops t-butyl hydroperoxide The procedure employed for adding and mixing the various chemicals was the same as in Example II. The reaction was stopped after approximately 30 minutes whereupon the white, hard product was recovered.

EXAMPLE IV

Using the same mixing procedure as in Examples II and III, a copolymer of methyl methacrylate and vinyltriethoxysilane was prepared employing the following smulsion system.

75 ml. distilled water
4.8 g. sodium salt of alkyl aryl polyester sulfonate emulsifier
43 g. methyl methacrylate
21.5 ml. vinyltriethoxysilane
0.8 ml. ferrous sulfate heptahydrate
0.2 g. ammonium persulfate
0.2 g. sodium metabisulfite
15 drops t-butyl hydroperoxide After about 38 minutes the reaction was halted and a white, hard copolymer was recovered by salting out with NaCl and washed free of emulsifier and salt.

EXAMPLE V

Following the procedure and redox recipe used in Example I, copolymers of various alkoxysilanes and ethyl acrylate were prepared as shown in Table I, infra.

The resulting copolymers were tested and exhibited generally improved heat resistance as compared with polyethylacrylate.

TABLE I

| Experiment | Silane | Ester | Remarks |
| --- | --- | --- | --- |
| 1 | 21.5 ml. ethyltriethoxysilane. | 43 ml. ethylacrylate | Decomposes 230° C. |
| 2 | 21.5 ml. methyltriethoxysilane. | do | Smokes at 200° C. |
| 3 | 21.5 ml. amyltriethoxysilane. | do | Do. |
| 4 | 21.5 ml. phenyltriethoxysilane. | do | Decomposes 289° C. |
| 5 | 21.5 ml. ethylorthosilicate. | do | Do. |
| 6 | 21.5 ml. diphenyldiethoxysilane. | do | Decomposes 270° C. |
| 7 | 21.5 ml. ethylpolysilicate | do | Decomposes 280° C. |

EXAMPLE VI

Using the identical redox recipe as in Example I with the exception that 21.5 ml. of polyvinyltriethoxysilane was used in place of the vinyltriethoxysilane, an emulsion polymerization reaction was carried out. Heat was applied as necessary and after about one half hour a white rubbery polymeric product was recovered. The polymer was tested and found to be insoluble in acetone, benzene and ethanol and exhibited good heat resistance.

Several of the polymers of the present invention were tested for solubility and the results are shown in Table II, below.

TABLE II

| Solvent | Methylmethacrylate and vinyltriethoxysilane | Ethylmethacrylate and vinyltriethoxysilane | Ethylacrylate and vinyltriethoxysilane |
| --- | --- | --- | --- |
| Acetone | Insoluble | Insoluble | Insoluble. |
| Benzene | do | do | Do. |
| Methylene chloride | do | do | Do. |
| Tetrahydrofuran | do | do | Do. |
| Carbon tetrachloride | do | do | Do. |
| Ethanol | do | do | Do. |

The foregoing examples illustrate that solid copolymers are produced according to the methods of the invention by employing an emulsion polymerization system. By comparison, attempts to polymerize vinylalkoxysilanes in emulsion systems have not met with sucess.

The presence of water results in a hydrolysis-condensation reaction of the alkoxy groups which competes with any addition polymerization reaction of the vinyl groups. In all cases in which emulsion polymerization was carried out, only gel-like materials were obtained. Infrared analysis showed no diminution of the vinyl band intensity thereby indicating that the addition polymerization is very much slower than the hydrolysis and condensation reactions.

While we have described and illustrated a preferred embodiment of our invention, we wish it to be understood that we do not intend to be restricted solely thereto, but that we do intend to cover all modifications thereof which would be apparent to one skilled in the art and which come within the spirit and scope of our invention.

What is claimed is:

1. A method for making solid polymeric products which comprises polymerizing a silane represented by the structural formula:

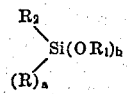

wherein R is a member selected from the group consisting of monovalent saturated hydrocarbon aliphatic group and monovalent aromatic hydrocarbon group containing from 1 to 9 carbon atoms, $R_1$ is an alkyl group containing from 1 to 6 carbon atoms, $R_2$ is a member selected from the group consisting of monovalent saturated aliphatic hydrocarbon groups, monovalent aromatic hydrocarbon groups containing from 1 to 9 carbon atoms, and $R_1O-$, $a$ is an integer from 0 to 2, $b$ is an integer from 1 to 3 and the sum of $a$ and $b$ is always 3, with an alkyl ester of an acrylic acid of the formula selected from the group consisting of

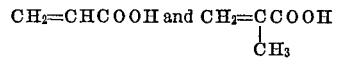

in an aqueous emulsion-redox system containing a water soluble peroxide initiator, wherein the silane is persent in an amount of 5 to 300% by volume of the acrylic acid ester.

2. A method as defined in claim 1 wherein the amount of the alkoxysilane is about 5% to about 300% by volume of the amount of the acrylic ester employed.

3. A method for making solid polymeric products as defined in claim 1 wherein the silane is ethyltriethoxysilane and the alkyl ester is ethyl acrylate.

4. A method for making solid polymeric products as defined in claim 1 wherein the silane is amyltriethoxysilane and the alkyl ester is ethyl acrylate.

5. A method for making solid polymeric products as defined in claim 1 wherein the silane is diphenyldiethoxysilane and the alkyl ester is ethyl acrylate.

6. A method for making solid polymeric products as defined in claim 1 wherein the silane is phenyltriethoxysilane and the alkylester is ethyl acrylate.

7. A method for making solid polymeric products as defined in claim 1 wherein the silane is methyltriethoxysilane and the alkyl ester is ethyl acrylate.

8. A method for making solid polymeric products as defined in claim 1 wherein the silane is ethylorthosilicate and the alkyl ester is ethyl acrylate.

9. A solid polymer produced by the process of claim 1.

10. A method for making solid polymeric products which comprises polymerizing an alkylpolysilicate wherein the alkyl group contains from 1 to 6 carbon atoms with an alkyl ester of an acrylic acid of the formula selected from the group consisting of:

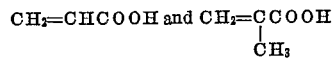

in an aqueous emulsion-redox system containing a water soluble peroxide initiator, wherein the silane is present in the amount of about 5 to 300% by volume of the acrylic acid ester.

11. A method for making solid polymeric products as set forth in claim 10 wherein the silane is ethylpolysilicate and the alkylester is ethyl acrylate.

References Cited

UNITED STATES PATENTS

| | | | |
|---|---|---|---|
| 2,442,613 | 6/1948 | Nicodemus | 260—827 |
| 2,860,074 | 11/1958 | Hedlund | 260—827 |
| 3,203,919 | 8/1965 | Brachman | 260—46.5 |
| 3,294,709 | 12/1966 | Nitzsche et al. | 260—29.6 |

OTHER REFERENCES

Stump, Copolymers of 1,1-dihydroperfluorobutyl Acrylate with some Vinyl Silanes, August 1957, Wadc Technical Report 56–520 Astia Document No. AD 118247, pp. 1 to 12, Office of Technical Services, U.S. Dept. of Commerce, Washington, D.C.

DONALD E. CZAJA, *Primary Examiner.*

M. I. MARQUIS, *Assistant Examiner.*

U.S. Cl. X.R.

260—29.2, 29.6, 827